S. McKIRAHAN.
PROCESS OF EXTRACTING METALS FROM ORES.
APPLICATION FILED FEB. 14, 1918.
1,425,667.
Patented Aug. 15, 1922.
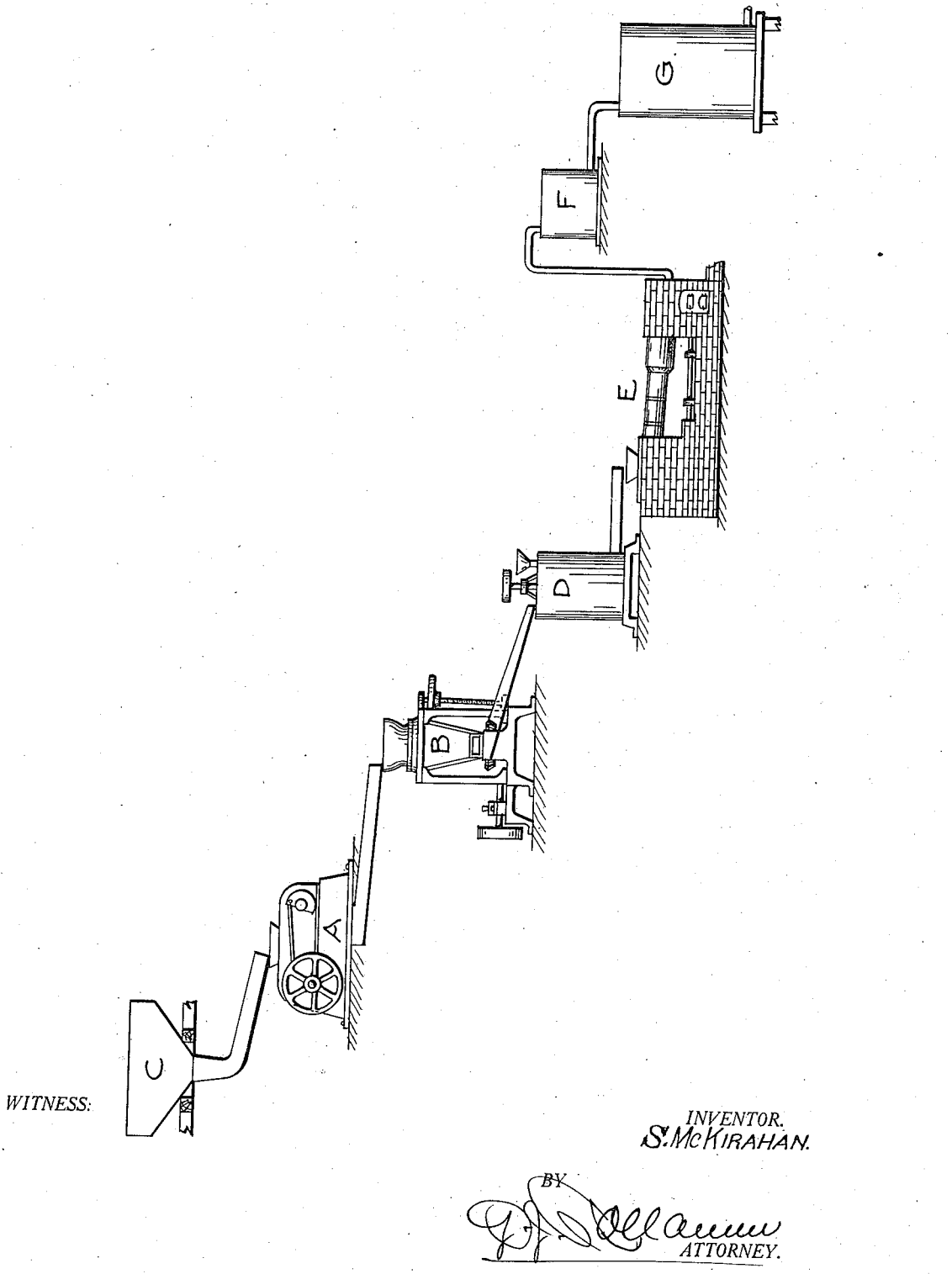
WITNESS:
INVENTOR.
S. McKIRAHAN.
BY
ATTORNEY.

UNITED STATES PATENT OFFICE.

SAMUEL McKIRAHAN, OF GOLDEN, COLORADO, ASSIGNOR, BY DIRECT AND MESNE ASSIGNMENTS, OF TWO-THIRDS TO F. A. FULLER, OF DENVER, COLORADO.

PROCESS OF EXTRACTING METALS FROM ORES.

1,425,667. Specification of Letters Patent. Patented Aug. 15, 1922.

Application filed February 14, 1918. Serial No. 217,279.

*To all whom it may concern:*

Be it known that I, SAMUEL McKIRAHAN, a citizen of the United States, residing at Golden, in the county of Jefferson and State of Colorado, have invented certain new and useful Improvements in Processes of Extracting Metals from Ores, of which the following is a specification.

This invention relates to a process of extracing metals from metalliferous ores, and its object is to provide a simple method of separating the metallic constituents of ores, from the extraneous matter with which they are associated, by causing their volatilization, and subsequently effecting their recovery from the volatile product.

The metals are volatilized by effecting an intermixture of the ore in a comminuted condition, with chlorine or a chlorine compound such as ordinary sodium chloride (NaCl) and subjecting the mixture to the influence of heat, it being essential that the fumes thus generated must be continuously and rapidly removed by any well known expedient such as a sufficient supply of air or a partial vacuum.

Having thus briefly described the nature of my process I will now proceed to explain the same in detail with reference to the accompanying drawing which shows diagrammatically the preferred arrangement of devices through which the material under treatment pass in the practice of my process.

Oxidized ore (a sulphide ore must be previously roasted) is finely crushed and ground in the crusher A and the grinder B to which it is fed from the ore-bin C. The finely comminuted ore is subsequently mixed in a suitable mixer D with chlorine or a chlorine compound, preferably common salt (NaCl), in a quantity sufficient to furnish enough chlorine to combine with the metal contents of the ore to form metal chlorides plus an excess of salt. An excess of 10% has been found to give satisfactory results.

The mixture is discharged from the mixer into a suitable kiln E in which it is heated to a temperature of not less than one thousand degrees centigrade and considerably higher according to the nature of the material under treatment in an oxidizing atmosphere.

As a result of this treatment the salt is decomposed and the chlorines liberated which combine with the metals present in the ore to form metal chlorides which are readily volatilized at about this temperature.

The amount of salt to be added to the ore, depends obviously upon the amount of metals present, it being as stated before, advantageous to add a sufficient quantity of salt to furnish enough chlorine for combination with the metals.

It may be said that the minimum amount of salt to be added should not be less than ten per cent of the discharge and the maximum amount of salt to be added should be enough to convert the metals present to chlorides, not counting the iron present.

Nearly all ores contain iron in varying amounts and while the liberated chlorine will combine with the iron it can in turn be compelled to give it up to the other metals in a hotter part of the furnace.

The metals are in the furnace volatilized as metal chlorides and the volatile product is passed into a cooling chamber F and from there through a precipitator G of suitable construction for the recovery of its metal contents.

If gold is present in the ore it is volatilized as gold chlorides and deposits out in the cooling chamber as metallic gold, for the reason that gold chlorides decompose into metallic gold as free chlorine at low temperatures.

The other metal chlorides are collected in the precipitator and treated as their nature demands.

I am aware that the extraction of metals from metalliferous ores has been effected by volatilization through the medium of sodium chloride and sulfur, under the universally accepted theory that sulfur is necessary to decompose the salt and liberate the chlorine which combining with the metals, renders them volatile.

I have fully demonstrated by carefully conducted experiments that the metallic contents of metalliferous ores may be completely extracted in a volatilization process, by the use of chlorine or a chlorine-compound, without the addition of sulfur or other decomposing agent, provided the temperature of the material is raised sufficiently high and the fumes are rapidly removed by a sufficient supply of air or a partial vacuum, as stated hereinbefore, and what I claim and desire to secure by Letters-Patent is:

1. The process of extracting metals from their ores consisting in mixing a finely comminuted oxidized ore with sodium chloride (NaCl), heating the mixture to a temperature considerably above one thousand degrees centigrade so as to cause volatilization of metal chlorides formed by the combination of metals present, with chlorine liberated by decomposition of the salt, and recovering the metal from the volatile product.

2. The process of extracting metals from their ores consisting in mixing a finely comminuted oxidized ore with sodium chloride in a quantity fully sufficient to furnish enough chlorine to combine with the metal contents of the ore to form metal chlorides, heating the mixture to a temperature considerably above one thousand degrees centigrade in an oxidizing atmosphere whereby to cause volatilization of metal chlorides formed by the combination of metals present, with chlorine liberated by decomposition of the salt, and recovering the metal from the volatile product.

3. The process of extracting metals from their ores consisting in mixing a finely comminuted oxidized ore with sodium chloride in a quantity fully sufficient to furnish enough chlorine to combine with the metal contents of the ore to form metal chlorides, heating the mixture to a temperature considerably above one thousand degrees centigrade, whereby to cause volatilization of metal chlorides formed by the combination of metals present, with chlorine liberated by decomposition of the salt, and recovering the metal from the volatile product.

4. The process of extracting metals from their ores consisting in mixing a finely comminuted oxidized ore with sodium chloride, heating the mixture to a temperature considerably above one thousand degrees centigrade in an oxidizing atmosphere whereby to cause volatilization of metal chlorides formed by the combination of metals present, with chlorine liberated by decomposition of the sodium chloride and recovering the metal from the volatile product.

In testimony whereof I have affixed my signature in presence of two witnesses.

SAMUEL McKIRAHAN.

Witnesses:
F. A. FULLER,
G. J. ROLLANDET.